No. 725,123. PATENTED APR. 14, 1903.
E. NICHOLS.
STERILIZING APPLIANCE.
APPLICATION FILED JULY 18, 1902.
NO MODEL.
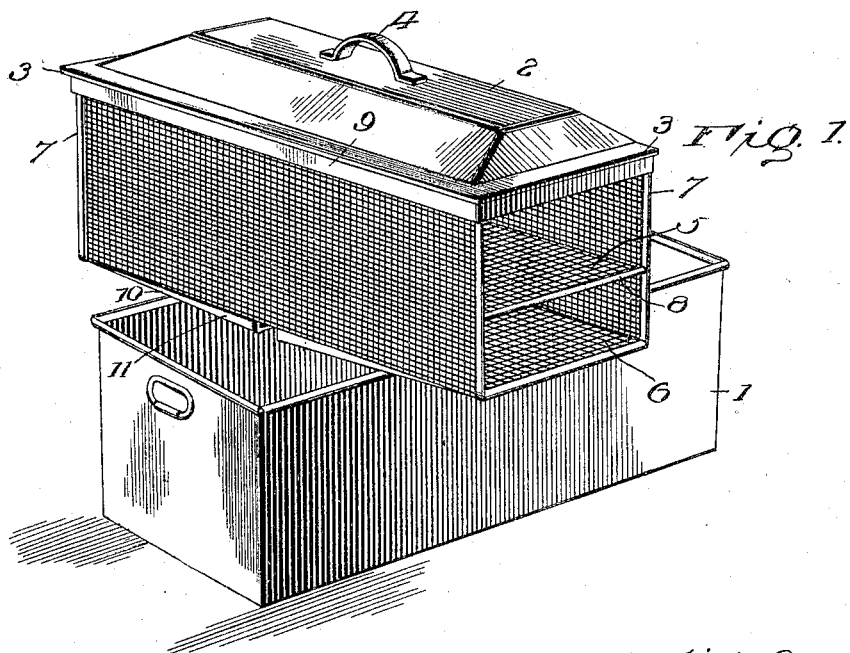
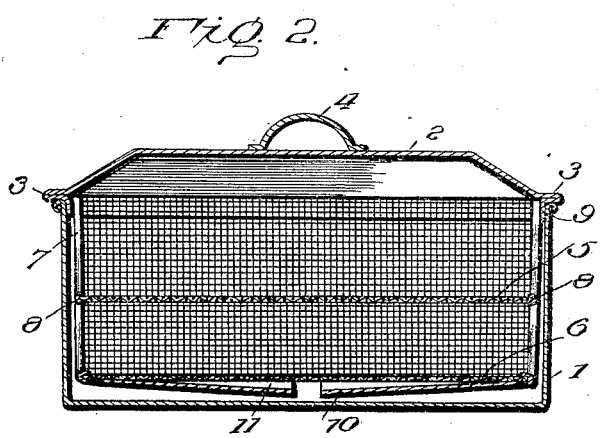
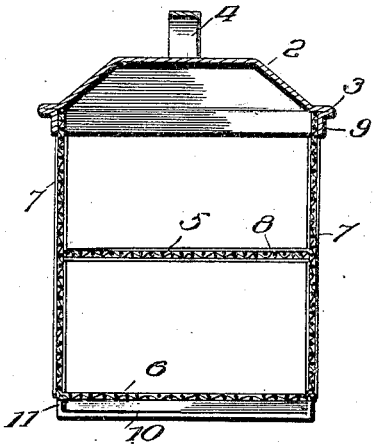
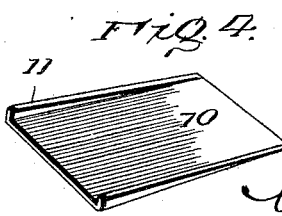
Witnesses
Wm J Jacob
C. S. Frye
Inventor
Edwin Nichols.
By W. T. Fitzgerald
Attorneys

UNITED STATES PATENT OFFICE.

EDWIN NICHOLS, OF NEWARK, OHIO.

STERILIZING APPLIANCE.

SPECIFICATION forming part of Letters Patent No. 725,123, dated April 14, 1903.

Application filed July 18, 1902. Serial No. 116,040. (No model.)

*To all whom it may concern:*

Be it known that I, EDWIN NICHOLS, a citizen of the United States, residing at Newark, in the county of Licking and State of Ohio, have invented certain new and useful Improvements in Sterilizing Appliances; and I do hereby declare the following to be a full, clear, and exact description of the invention, such as will enable others skilled in the art to which it appertains to make and use the same.

My invention relates to sterilizing appliances; and it consists of certain novel features of combination and construction of parts, the preferred form or materialization whereof will be hereinafter clearly set forth, and pointed out in the claim.

The object of my invention is to provide a sterilizing appliance which while useful for a great variety of purposes will be found especially desirable for the use of surgeons, physicians, and others desiring to very quickly and cheaply effect a reliable and perfect sterilization of their instruments or appliances, &c., at the expense of a minimum amount of time and labor.

Other objects and advantages will be hereinafter made clearly apparent, reference being had to the accompanying drawings, made a part of this application, and in which—
Figure 1 is a perspective view of my invention complete ready for use. Fig. 2 shows the parts illustrated in Fig. 1 assembled in their respective operative positions. Fig. 3 is a transverse section on a slightly-enlarged scale over that presented in Fig. 2, showing the parts of my invention complete and in operative combination. Fig. 4 is a perspective detail showing the drainage-pan or false bottom.

In order to conveniently designate the various details of my invention and coöperating accessories, numerals will be employed, of which 1 illustrates the exterior portion or reservoir, which may be made any preferred size and any desired shape and of any suitable material and is designed to wholly inclose my improved sterilizing appliance with the exception of the upper portion thereof, as will be hereinafter more clearly set forth.
Designed to tightly fit the reservoir or boiler 1 is the cover or lid 2, provided with the flange or rim 3, adapted to rest snugly in contact with the upper edge of the reservoir, as clearly shown in Fig. 2, a suitable handle 4 being provided to facilitate the removal of said lid when desired. I preferably permanently connect to the under side of the lid 2 my sterilizing appliance proper, formed of closely-meshed wire, as clearly shown in Fig. 1. It will be observed that this receptacle is left open at each end and is provided with a shelf or auxiliary floor-section 5, adapted to increase the capacity of the receptacle, whereby the instruments or other objects to be sterilized may be placed either upon the shelf or upon the bottom proper, 6, as may be desired. The receptacle thus formed of closely-meshed wire may be reinforced and properly sustained at each end thereof and, if found desirable, also at proper intervals throughout the length of the same with the framing-section 7 and with the cross-bar 8.

In order to reliably retain the steam within the reservoir 1, I also prefer to provide the depending flanges 9, comprising an integral part of the lip or edge section 3, said flange 9 forming a convenient seat whereby the upper edges of the meshed side walls may be reliably secured in engagement therewith in any suitable way, as by soldering the same.

In order to effect the best results, only a very small quantity of water is required in the reservoir 1, thus making it possible to very quickly generate steam, and as the steam will be reliably retained within the reservoir when the lid is forced downward thereon the instruments or appliances placed upon the floor-sections 5 and 6 will be thoroughly sterilized by the action of the superheated steam thus generated, and after the contents have been subjected to the action of the heat a sufficient length of time the sterilizing-receptacle proper may be readily withdrawn by means of the handle 4 and transversely placed upon the reservoir 1 to drain, and in order to facilitate the conveyance of the condensed steam and moisture back into the reservoir 1 I provide the drainage-bottom 10, formed of any suitable sheet metal and so connected to the meshed receptacle, as by means of the integral flanges 11, that the drainage will be toward the center, and since the drainage-bottom is preferably made in two sections and are so disposed that they will drain toward each other or to the center of the sterilizing-receptacle proper I form them of sufficient length to permit the water gathered by said bottom-sections to drip freely off of the inner edges thereof into the reservoir, thereby preventing the drainage from falling directly upon the floor or table in case the reservoir has been removed from the stove or other source of heat.

It will of course be understood that the drainage-bottom may be entirely omitted, if desired, to provide cheaper construction, and I desire, therefore, to reserve the right to employ said bottom in constructing my sterilizing appliance or wholly omit it, if in any case I may find it desirable to do so.

The handle-section 4 will enable the receptacle proper to be readily removed with the accompanying instruments, &c., contained therein and easily carried from place to place, or the entire reservoir may be bodily lifted from off the stove and carried to the room where the instruments or appliances are to be employed.

By placing only a limited quantity of water in the reservoir 1 it is obvious that superheated steam may be very quickly generated, thereby producing all of the conditions to accomplish absolute or perfect sterilization, and since my improved sterilizing appliance may be made of any preferred size and of any suitable material it will be found very cheap and convenient for all situations, as for the private practice of a surgeon or physician or for use in hospitals.

It will be understood that sheet metal, if properly perforated with a suitable number of holes, may be used as the equivalent of the meshed wire, the object being to insure that the steam will be left free to find its way into contact with the instrument contained within the holder, and I therefore wish to comprehend in this application all substitutes and equivalents that may be considered as falling fairly within the scope of my invention.

Believing that the advantages and manner of using my sterilizing appliance have been fully set forth in the foregoing specification, considered in connection with the accompanying drawings, further reference to the details is deemed unnecessary.

Having thus fully described my invention, what I claim as new, and desire to secure by Letters Patent, is—

The herein-described sterilizing appliance, comprising the combination with a suitable reservoir, of a sterilizing appliance proper consisting of a suitable closure or lid-section adapted to fit the mouth of said reservoir; an instrument-holding appliance formed of meshed wire having a plurality of floor-sections and an auxiliary drainage-bottom comprising the inwardly-inclined members 10 adapted to direct the drainage due to condensation into the reservoir when the instrument-holder is placed thereon all combined substantially as specified and for the purpose set forth.

In testimony whereof I affix my signature in presence of two witnesses.

EDWIN NICHOLS.

Witnesses:
J. A. FLORY,
W. L. FLORY.